United States Patent [19]

Hyodo et al.

[11] 4,402,297
[45] Sep. 6, 1983

[54] INTAKE SYSTEM OF ENGINES

[75] Inventors: Motoaki Hyodo, Shizuoka; Soichi Anma, Fukurio, both of Japan

[73] Assignee: Yamaha Hatsudoki Kabushiki Kaisha, Iwata, Japan

[21] Appl. No.: 277,325

[22] Filed: Jun. 25, 1981

[30] Foreign Application Priority Data

Jun. 28, 1980 [JP] Japan ............................ 55-88066

[51] Int. Cl.³ ............................................ F02B 75/18
[52] U.S. Cl. ................................. 123/591; 123/52 M; 123/52 MB
[58] Field of Search ................ 123/52 M, 52 MB, 591

[56] References Cited

U.S. PATENT DOCUMENTS 2,014,371  9/1935  Barker ............................ 123/52 M
3,990,414  11/1976  Malphettes ........................ 123/585
4,231,329  11/1980  Ishida ............................. 123/591

FOREIGN PATENT DOCUMENTS 162083  4/1921  United Kingdom ............ 123/52 M

Primary Examiner—Charles J. Myhre
Assistant Examiner—E. Rollins Cross
Attorney, Agent, or Firm—Ernest A. Beutler

[57] ABSTRACT

An induction system for an internal combustion engine embodying a plenum chamber that communicates with the intake system between the carburetor and the engine chamber so as to promote continuous flow even at low speeds to improve low speed charging efficiency. A fuel return conduit separately communicates the plenum chamber with the intake passage for returning condensed fuel in a relatively continuous fashion to the intake passage so as to avoid mixture strength variations.

6 Claims, 3 Drawing Figures

INTAKE SYSTEM OF ENGINES

BACKGROUND OF THE INVENTION

This invention relates to an intake system for engines, and more particularly to an induction system that offers significantly improved low and medium speed performance for the engine.

The difficulties in achieving good charging efficiencies at low engine speeds and when the throttle valve of the engine is partially or fully closed are well known. Under such conditions the uneven intake stroke of the engine causes intermittent flow through the induction passage which gives rise to the poor charging efficiency and low engine performance. Recently, it has been proposed to offset this deficiency and improve breathing capacity under these conditions by providing a plenum chamber that communicates with the intake passage downstream of the throttle valve. Several embodiments of such constructions and a more thorough description of the advantages and theory behind this system are disclosed in the copending application of Noritaka Matsuo, et al. entitled "Intake System for Engine," Ser. No. 163,201, filed June 25, 1980, and assigned to the assignee of this application. With an induction system embodying a plenum chamber of this type, the fuel and air charge delivered to the plenum chamber after the completion of one intake stroke may not be completely discharged back into the induction system during the next succeeding intake stroke under all running conditions. As a result of the retention of a portion of the fuel air charge in the plenum chamber during succeeding intake cycles, there may be fuel condensation occur within the plenum chamber. The condensed fuel will eventually reenter the induction system through the connecting passage, but the degree of such reentry is variable and can, under some circumstances result in mixture strength variations being delivered to the engine chambers.

In order to preclude these mixture strength variation problems while maintaining the advantages of the use of such a plenum chamber, it has been proposed to orient the plenum chamber and its connecting passage with the induction system in such a way that any condensed fuel will be fed continuously to the induction system. This can be done by providing the plenum chamber with an inclined lower wall which terminates at the conduit that communicates the plenum chamber with the intake system. Embodiments of such an arrangement are shown in the copending application of Noritaka Matsuo, et al., entitled "Intake System for Engines," Ser. No. 238,641, filed Feb. 26, 1981. In many instances it may be impossible, due to physical environment in which the engine and induction is employed, to make use of such an arrangement where the fuel is returned to the intake system from the plenum through the same conduit that communicates the air and fuel between the plenum chamber and the intake system. This is particularly true in conjunction with motorcycles wherein spacial limitations are at a premium.

It is, therefore, a principal object of this invention to provide an improved intake system for internal combustion engines.

It is another object of this invention to provide an improved intake system for engines for significantly augmenting low and medium speed charging efficiencies.

It is yet a further object of this invention to provide an engine induction system including a plenum chamber device and an improved arrangement for ensuring against variations in mixture strength during engine running.

SUMMARY OF THE INVENTION

This invention is adapted to be embodied in an induction system for an internal combustion engine variable volume chamber. An intake passage communicates with the chamber and a charge forming device delivers a charge to the intake passage. A throttle valve controls the flow through the intake passage to the chamber. A plenum chamber is provided that is in communication with the intake passage through conduit means. The plenum chamber communicates with the intake passage upstream of the variable volume chamber and downstream of the charge forming device and the throttle valve. In accordance with the invention, a fuel return conduit communicates the plenum chamber with the intake passage for returning condensed fuel from the plenum chamber to the intake passage.

DETAILED DESCRIPTION OF THE PREFERRED EMBODIMENT

Figure 1:
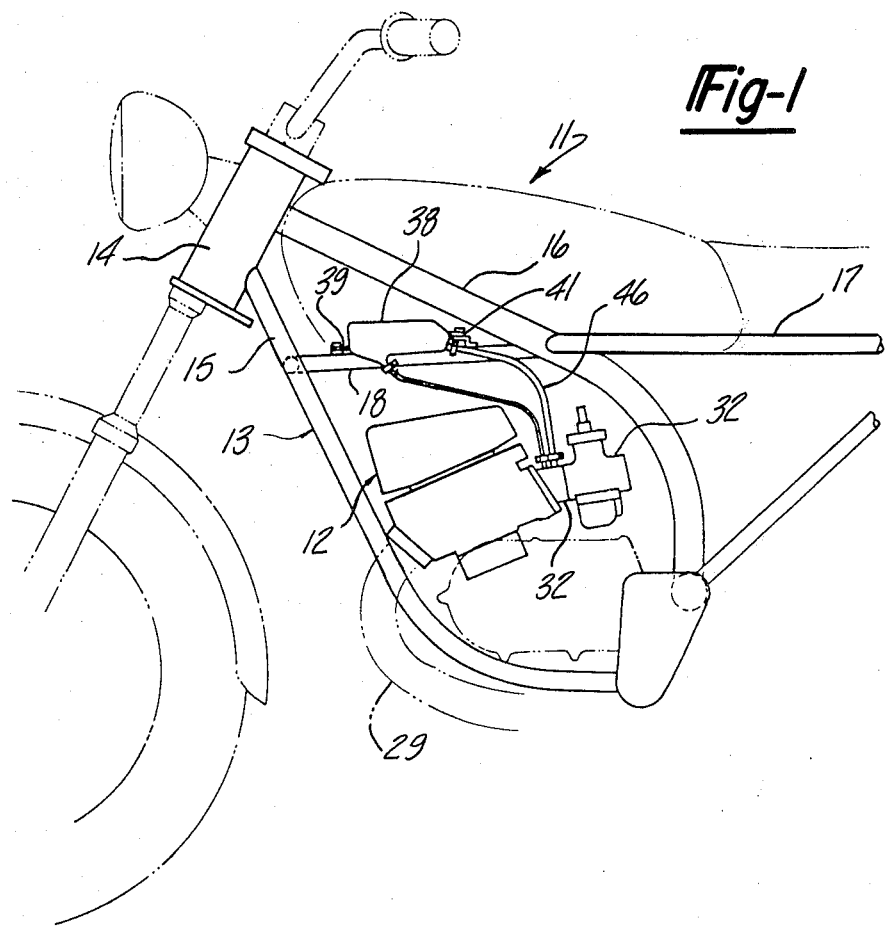
FIG. 1 is a side elevational view of a portion of the motorcycle incorporating this invention.
Figure 2:
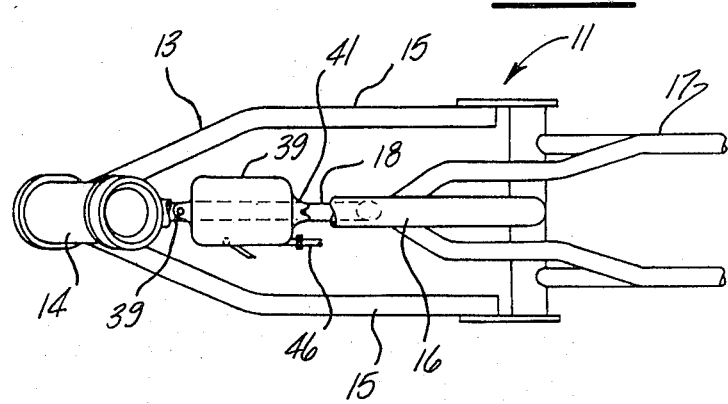
FIG. 2 is a top plan view of the portions of the motorcycle shown in solid lines in FIG. 1.
Figure 3:
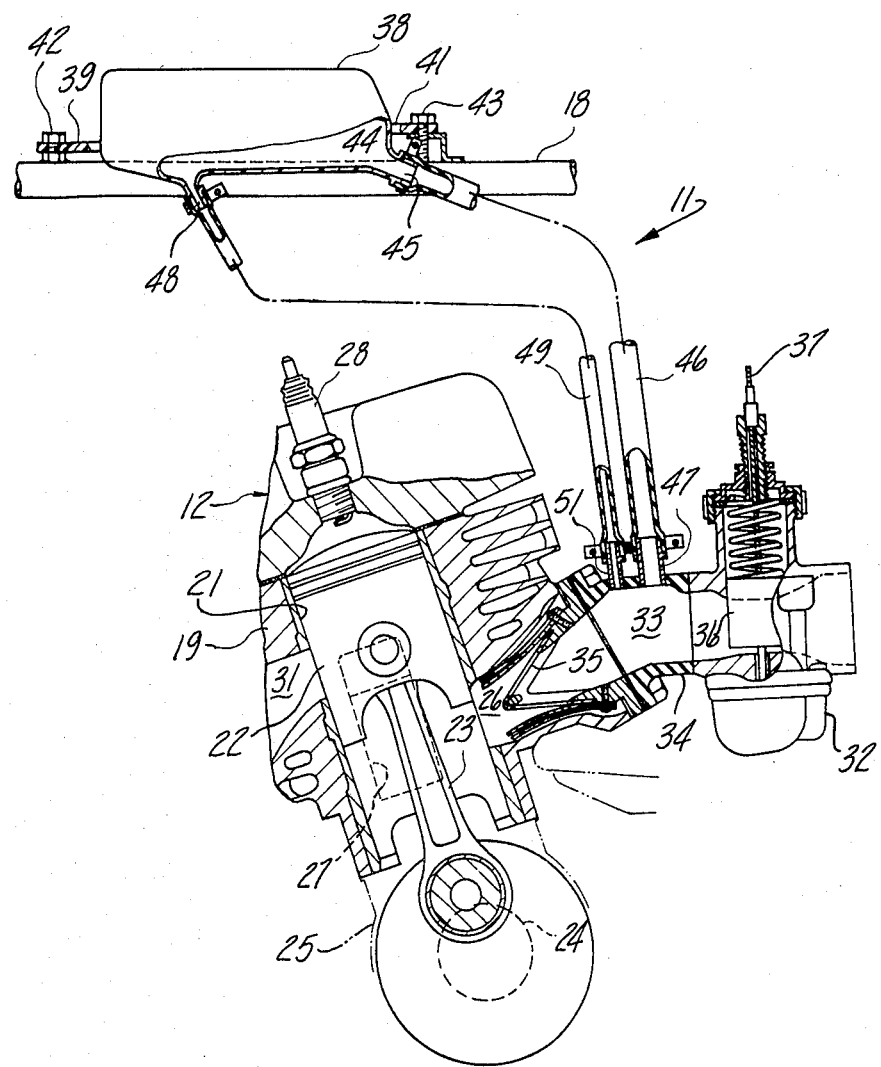
FIG. 3 is an enlarged side elevational view showing portions of the engine and induction system in section.

In the drawings, a motorcycle constructed in accordance with this invention is identified generally by the reference numeral 11. The motorcycle 11 is provided with an engine, indicated generally by the reference numeral 12, which in the illustrated embodiment is of the single cylinder two cycle type. It is to be understood, however, that the invention is susceptible of use with engines having more than one chamber and also with engines of other than the two cycle type. The engine 12 is mounted in a known manner in a frame 13 of the motorcycle. The frame 13 includes a head tube 14 that journals the front strut, shown in phantom, for its steering movement, a down tube 15, a main tube 16, and a seat tube 17 that are connected together in a known manner. A reinforcing tube 18 extends from the down tube 15 to the main tube 16 and the engine 12 is positioned between these tubes.

The engine 12 includes a cylinder block 19 in which a cylinder bore 21 is formed. A piston 22 reciprocates within the cylinder bore 21 and is connected by means of a connecting rod 23 to a crankshaft 24 which is, in turn, rotatably supported in the crankcase of the engine, shown in phantom and identified by the reference numeral 25.

An intake charge is delivered through an intake passage 26 formed in the cylinder block 19 during the upward movement of the piston 22. When the piston 22 commences its downward movement, the intake charge is compressed in the crankcase 25, as is well known with this type of engine, for eventual transfer to the combustion chamber of the engine through transfer or scavenge ports 27. The charge is fired in the combustion chamber by means of a spark plug 28 in a known manner for discharge through an exhaust system shown partially in phantom in FIG. 1 and identified by the reference numeral 29 via a cylinder block exhaust passage 31.

Air for the induction system is supplied to a carburetor, indicated generally by the reference numeral 32 via an air cleaner (not shown). The carburetor 32 discharges a fuel air charge to the cylinder block intake passage 26 through an intake passage 33 of a spacer 34 which is interposed between the carburetor 32 and cylinder block 19. A reed type check valve 35 is provided in the cylinder block intake passage 26 to prevent backflow of intake gases during the initial portion of the compression of the intake charge in the crankcase 25. The speed of the engine is controlled by the throttle valve 36 of the sliding piston type which is provided in the carburetor 32. The throttle valve 36 is controlled in a known manner by means of a cable 37 controlled by the operator.

As forenoted, the alternate opening and closing of the intake passage 26 communication with the crankcase 25, particularly at low speeds and when the throttle valve 36 is partially closed gives rise to intermittent flow in the intake system with resultant poor charging efficiency at low engine speeds. To overcome these difficulties and to ensure a more uniform flow through the intake system, even at low engine speeds, a plenum chamber 38 is provided which is in communication with the intake system between the throttle valve 36 and the crankcase 25 in a manner to be described. The plenum chamber 38 consists of a tank which may be formed from molded plastic or the like and which has integral forwardly and rearwardly extending tabs 39 and 41 that are affixed to the frame tube 18, by means of fasteners 42 and 43.

The plenum chamber 38 defines an interior volume 44 and has a rearwardly extending nipple portion 45 that communicates the volume 44 with a flexible conduit 46. The other end of the conduit 46 is connected to a nipple 47 of the spacer 34 in communication with its intake passage 35. The volume of the chamber 44 and length and diameter of the interconnecting conduit 46 is such so as to provide the desired intake effect. That is, when the piston 22 is undergoing its upward movement to increase the volume in the crankcase cavity 25, a partial vacuum will be exerted which is transmitted through the conduit 46 to the volume 44. This vacuum prevails when piston 22 moves downwardly to close the port at the end of the intake passage 26 so that the intake charge will continue to flow past the carburetor 32 into the plenum chamber 44. As has been aforenoted, this arrangement significantly improves charging efficiency particularly at low and medium engine speeds, particularly when the throttle valve 36 is less than fully open.

The charge which has been drawn into the plenum chamber volume 44 will be in part reintroduced to the induction passage 33 during the next opening of the intake passage 26 by the movement of the piston 22. A portion of the fuel and air charge will, however, remain in the volume 44 particularly at low engine speeds. The remainder of a portion of the fuel air charge in the plenum chamber volume 44 may have a tendency to cause fuel condensation. If this fuel which condenses is permitted to reenter the induction system through the conduit 46, there will be intermittent reintroduction of this fuel. This intermittent reintroduction will give rise to variations in mixture strength and result in uneven and unsatisfactory engine performance.

In order to ensure a continuous reintroduction of condensed fuel into the induction system and thus avoid variations in mixture strength, a fuel return nipple 48 is formed in the lower wall of the plenum chamber 38 at a location spaced from the nipple 45. A relatively small flexible fuel return conduit 49 interconnects the nipple 48 with a fuel return nipple 51 formed in the spacer 34 adjacent to and downstream of the nipple 47. The conduit 49 and nipples 48 and 51 are relatively small in size so that there will be no significant fuel air mixture flow between the intake passage and the volume 44 through these components. The size is, however, sufficient so as to afford a continuous flow of any fuel which may condense in the plenum chamber 38 back to the intake passage 35 of the spacer 34 for reintroduction into the intake system to avoid any variations in mixture strength.

It should be readily apparent from the foregoing description that an arrangement is provided that ensures good engine breathing even at low engine speeds and with low throttle openings by providing a plenum chamber in communication with the intake system between the throttle valve and engine chamber that promotes a relatively continuous flow through the intake system, even at low engine speeds. In addition, any fuel which may condense in the plenum chamber is continuously returned to the intake system through a separate fuel conduit so as to insure against any variations in mixture strength. Various changes and modifications may be made without departing from the spirit and scope of the invention, as defined by the appended claims.

What is claimed is:

1. An induction system for an internal combustion engine having a chamber that cyclically varies in volume, an intake passage communicating with said chamber, a charge forming device for delivering a charge to said intake passage, a throttle valve in said intake passage for controlling the flow therethrough, a plenum chamber, and conduit means communicating said plenum chamber with a portion of said intake passage upstream of said variable volume chamber and downstream of said charge forming device and said throttle valve, the improvement comprising said plenum chamber having a lower wall with a fuel return opening formed therein at a point vertically above said intake passage portion, said fuel return opening being spaced from the opening of said conduit means into said plenum chamber, and a fuel return conduit extending generally vertically and communicating said fuel return opening with said intake passage for returning condensed fuel from said plenum chamber to said intake passage by gravity flow.

2. In an induction system as set forth in claim 1 wherein the fuel return conduit is sized so as to preclude any substantial air flow between the plenum chamber and the intake passage through said fuel return conduit.

3. In an induction system as set forth in claim 1 wherein the fuel return conduit communicates with the intake passage upstream of the variable volume chamber and downstream of both of the charge forming device and the throttle valve.

4. In an induction system as set forth in claim 3 wherein the fuel return conduit is sized so as to preclude any substantial air flow between the plenum chamber and the intake passage through said fuel return conduit.

5. In an induction system as set forth in claims 1, 2, 3 or 4 wherein the throttle valve is a part of the charge forming device and the charge forming device comprises a carburetor.

6. An induction system as set forth in claim 5 further including check valve means interposed between the intake passage and the chamber and downstream of the portion of the intake passage for permitting flow from the intake passage into the chamber and precluding flow from the chamber back into the intake passage.

* * * * *